(12) United States Patent
Terrell, II (10) Patent No.: US 7,698,490 B2
(45) Date of Patent: Apr. 13, 2010

(54) PASSIVE USB POWER CONFIGURATION SWITCHING

(75) Inventor: James R Terrell, II, Charlotte, NC (US)

(73) Assignee: NVIDIA Corporation, Santa Clara, CA (US)

( * ) Notice: Subject to any disclaimer, the term of this patent is extended or adjusted under 35 U.S.C. 154(b) by 207 days.

(21) Appl. No.: 11/306,268

(22) Filed: Dec. 21, 2005

(65) Prior Publication Data

US 2007/0143505 A1    Jun. 21, 2007

(51) Int. Cl.
G06F 13/00 (2006.01)
G06F 1/00 (2006.01)
H02J 7/04 (2006.01)

(52) U.S. Cl. .......................... 710/302; 710/62; 710/72; 710/105; 713/300; 713/310; 713/320; 320/155; 702/60

(58) Field of Classification Search ............... 710/8–14, 710/302; 713/300–340
See application file for complete search history.

(56) References Cited

U.S. PATENT DOCUMENTS

| | | | |
|---|---|---|---|
| 5,220,660 A | | 6/1993 | Yoshizawa et al. |
| 5,510,740 A | | 4/1996 | Farrell et al. |
| 5,530,845 A | | 6/1996 | Hiatt et al. |
| 5,675,813 A | * | 10/1997 | Holmdahl ................... 713/310 |
| 5,758,133 A | | 5/1998 | Evoy |
| 5,799,196 A | * | 8/1998 | Flannery ..................... 713/320 |
| 5,862,368 A | | 1/1999 | Miller et al. |
| 6,044,428 A | | 3/2000 | Rayabhari ................... 710/129 |
| 6,118,254 A | * | 9/2000 | Faulk ........................... 320/141 |
| 6,128,743 A | * | 10/2000 | Rothenbaum ............... 713/300 |
| 6,212,645 B1 | | 4/2001 | Tjandrasuwita |
| 6,397,340 B2 | | 5/2002 | Watts, Jr. et al. |
| 6,625,761 B1 | * | 9/2003 | Sartore et al. ................. 714/43 |
| 6,633,932 B1 | * | 10/2003 | Bork et al. ..................... 710/72 |
| 6,647,452 B1 | | 11/2003 | Sonoda ........................ 710/305 |
| 6,665,801 B1 | * | 12/2003 | Weiss ........................... 713/300 |
| 6,668,296 B1 | * | 12/2003 | Dougherty et al. .......... 710/303 |
| 6,704,824 B1 | | 3/2004 | Goodman ................... 710/300 |
| 6,728,959 B1 | | 4/2004 | Merkey |
| 6,735,648 B2 | * | 5/2004 | Onishi ........................... 710/62 |
| 6,738,213 B2 | * | 5/2004 | Haitani ......................... 360/71 |
| 6,754,837 B1 | | 6/2004 | Helms |

(Continued)

OTHER PUBLICATIONS

USB Hub—retrieved from "http://en.wikipedia.org/wiki/USB_hub" on Sep. 28, 2007—3 pages.*

(Continued)

*Primary Examiner*—Mark Rinehart
*Assistant Examiner*—Brian T Misiura (57) ABSTRACT

A system for a universal serial bus (USB) device to perform power configuration to operate with a USB host. A connection to the USB host is enabled. Then a high-power configuration is reported to the USB host and successful enumeration by the USB host is monitored for. If such enumeration is not forthcoming within a preset time, the connection to the USB host is disabled and re-enabled, and a low-power configuration is then reported to the USB host. Optionally, the system can further ramp up power usage until a preset high-power configuration is reached, or until there is voltage sag on the VBUS and then either ramp power usage back down or measure the sag and set to a calculated power usage.

18 Claims, 5 Drawing Sheets

U.S. PATENT DOCUMENTS

| | | | |
|---|---|---|---|
| 6,775,776 B1 | 8/2004 | Vogt et al. | |
| 6,804,267 B1 | 10/2004 | Long et al. | |
| 6,816,809 B2 | 11/2004 | Circenis | |
| 6,845,456 B1 | 1/2005 | Menezes et al. | |
| 6,934,788 B2* | 8/2005 | Laity et al. | 710/303 |
| 6,946,817 B2* | 9/2005 | Fischer et al. | 320/132 |
| 6,954,814 B1 | 10/2005 | Leach | 710/305 |
| 6,957,292 B2* | 10/2005 | Croyle | 710/305 |
| 6,963,933 B2 | 11/2005 | Saito et al. | 710/1 |
| 6,963,986 B1* | 11/2005 | Briggs et al. | 713/320 |
| 6,990,594 B2 | 1/2006 | Kim | |
| 7,024,569 B1* | 4/2006 | Wright et al. | 713/300 |
| 7,043,649 B2 | 5/2006 | Terrell, II | |
| 7,069,347 B1* | 6/2006 | Kolokowsky | 710/8 |
| 7,072,989 B1* | 7/2006 | Kolokowsky et al. | 710/8 |
| 7,170,259 B2* | 1/2007 | Veselic | 320/114 |
| 7,173,964 B2* | 2/2007 | Hsu | 375/225 |
| 7,177,969 B2* | 2/2007 | Croyle | 710/305 |
| 7,271,568 B2* | 9/2007 | Purdy et al. | 320/106 |
| 7,373,529 B2* | 5/2008 | Nishida et al. | 713/300 |
| 2001/0044909 A1 | 11/2001 | Oh et al. | |
| 2002/0162035 A1* | 10/2002 | Tsukihashi | 713/300 |
| 2002/0169915 A1 | 11/2002 | Wu | 710/305 |
| 2004/0215452 A1* | 10/2004 | Pearah et al. | 704/231 |
| 2004/0239294 A1* | 12/2004 | Veselic et al. | 320/155 |
| 2005/0033996 A1* | 2/2005 | Fong et al. | 713/300 |
| 2005/0125705 A1 | 6/2005 | Cheng et al. | |
| 2005/0144495 A1* | 6/2005 | Nakajima et al. | 713/340 |
| 2005/0267999 A1* | 12/2005 | Suematsu et al. | 710/14 |
| 2006/0218415 A1* | 9/2006 | Mak-Fan et al. | 713/300 |
| 2006/0261788 A1* | 11/2006 | May | 323/273 |
| 2006/0287007 A1* | 12/2006 | Veselic et al. | 455/572 |
| 2007/0088967 A1* | 4/2007 | Fu et al. | 713/340 |
| 2007/0130573 A1* | 6/2007 | Farquhar | 719/321 |
| 2007/0132427 A1* | 6/2007 | Veselic | 320/111 |
| 2007/0143505 A1* | 6/2007 | Terrell | 710/10 |

OTHER PUBLICATIONS

USB Compliance Checklist Hubs (Excluding Root Hubs), Oct. 5, 2001, 9 pages.*
Universal Serial Bus Specification Revision 2.0, Apr. 20, 2007—pp. 243 and 244.*

* cited by examiner

PASSIVE USB POWER CONFIGURATION SWITCHING

TECHNICAL FIELD

The present invention relates generally to processes or apparatus for transferring or further transferring data from one or more peripherals to one or more computers or digital data processing systems, and more particularly to the power configuration of Universal Serial Bus (USB) devices.

BACKGROUND ART

Figure 1:
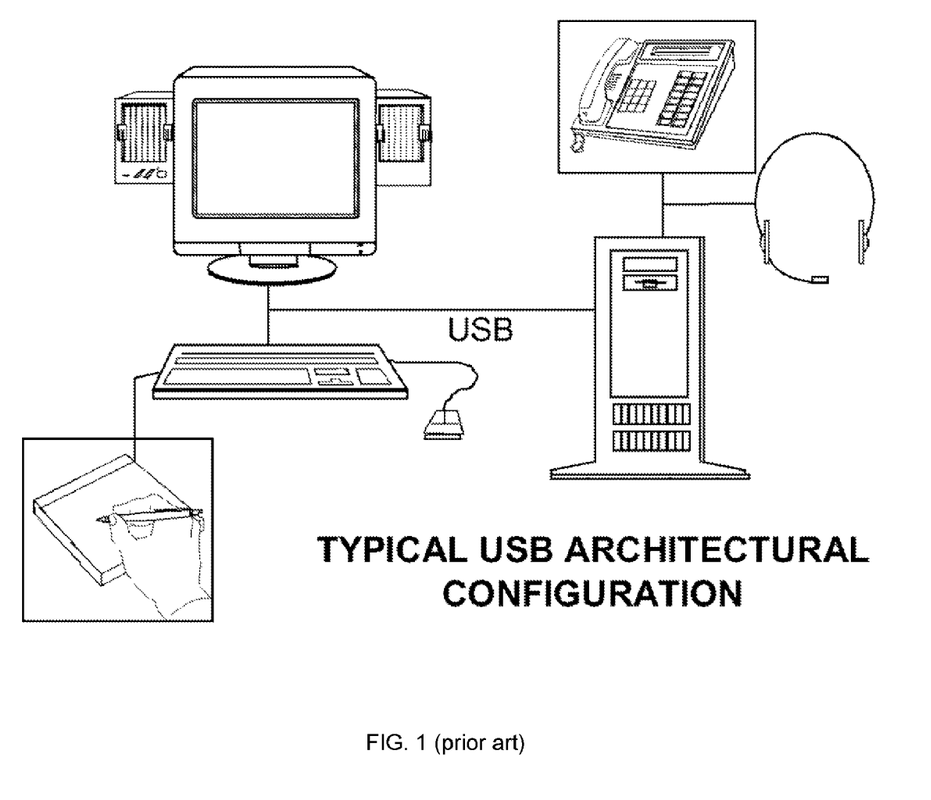
FIG. 1 (prior art) is a schematic diagram depicting a typical USB architectural configuration.

The USB was initially specified as an industry-standard extension to the personal computer (PC) architecture to allow connection to a host of up to 127 peripheral devices. Since its introduction, the USB standard has been widely applied in PC-type hosts for use with PC-type peripheral devices, and increasingly it is being applied in hosts and devices beyond the traditional PC field. FIG. 1 (prior art) is a schematic diagram depicting a typical USB architectural configuration.

The current specification for USB is defined in the document UNIVERSAL SERIAL BUS SPECIFICATION, Rev. 2.0, Apr. 27, 2000, by Compaq Computer Corporation, Hewlett-Packard Company, Intel Corporation, Lucent Technologies Inc., Microsoft Corporation, NEC Corporation, and Koninklijke Philips Electronics N.V. (hereinafter the "USB specification").

Figure 2:
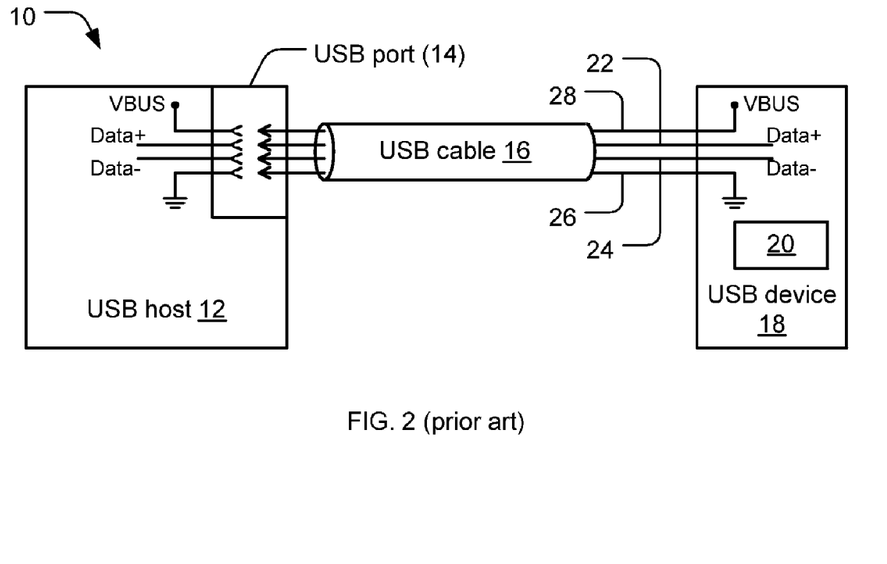
FIG. 2 (prior art) is a schematic diagram depicting some key features of an exemplary USB connection.

FIG. 2 (prior art) is a schematic diagram depicting some key features of an exemplary USB connection 10. Here a USB host 12 has a USB port 14 (including a connector) to which a USB cable 16 can be attached to connect a USB-capable peripheral device (USB device 18). The USB device 18 includes conventional circuitry 20, to operate its USB functions as well as for whatever utilitarian functions it provides.

The USB cable 16 and the USB device 18 can be integrated, as shown in FIG. 2, or they may be distinct devices in their own right (in which case the USB device 18 will include a connector of its own to receive its end of the USB cable 16). It should also be noted that a large class of USB devices 18 now also exist that connect directly to a USB port 14. In fact, a sub-class of these devices are protocol converters that permit direct or cabled connection of non-USB devices to USB ports 14. Furthermore, the USB specification provides for a hierarchical arrangement of one or more USB hubs between a USB host 12 and any ultimate end USB devices 18 (see e.g., FIG. 1, wherein a USB-capable keyboard accepts keyed input and serves as a USB hub to a USB-capable mouse and a USB-capable pen input device). USB hubs and USB devices that are "downstream" from a given USB port are therefore sometimes collectively termed "USB slave devices."

While FIG. 2 is merely representative, it illustrates a salient feature of all USB connections. The USB specification defines a 4-conductor scheme, including a data+ conductor 22, a data– conductor 24, a ground conductor 26, and a VBUS conductor 28. When active, the VBUS conductor 28 is nominally powered at +5V by the USB host 12. By virtue of the ground conductor 26 and the VBUS conductor 28 it is thus optionally possible to power one or more USB devices 18. Some USB devices 18 even employ this feature parasitically, to recharge their own internal power supplies for use later when the USB device 18 is disconnected from the USB port 14.

USB devices that rely on power from the cable are called "bus-powered devices" and those that have an alternate source of power are called "self-powered devices." Furthermore, some USB devices are capable of operation in either bus-powered or self-powered modes, and some can selectively operate in either mode, depending on whether a USB port appears to be able to supply their power needs.

The USB specification dictates that a USB port must be able to supply a minimum of 100 mA at 5V on the VBUS circuit. Optionally, the USB port can support high-power devices that can draw up to 500 mA at 5V. When a USB device is first connected to a USB port, it must limit its power draw to the 100 mA minimum. As described in the USB specification, a USB host enumerates a USB device first in low-power mode, and determines its maximum configurable power draw. The USB device may report multiple power configurations, each requiring different power draw amounts. For example, the USB device may report a low power configuration for use with low power USB ports as well as a high-power configuration where it might enable a battery charger or other high-current function when connected to a USB port that can supply the extra power. After the USB host enumerates the USB device power configuration options, it can then set the USB device to use the highest-power configuration that is supported by the USB port that the USB device is attached to.

The challenge that arises is that some USB hosts, notably those running variants of the Microsoft Windows™ operating system, do not enumerate multiple USB device configurations. These USB hosts simply use the first configuration reported by the USB device. If the USB port cannot support the power requirements reported by the first USB device configuration, then the USB host will not configure the USB device and it becomes unusable on that USB port.

One solution to this problem is for the device to report a lower power requirement than it plans to use. This tricks the USB host into allowing the USB device to be configured on a USB port that may not supply enough power. Depending on the USB port such a USB device is attached to, this can lead to voltage sags on the VBUS and erratic USB device operation. Also, a USB device that draws more current than it reports in its configuration descriptors will not pass USB certification testing and cannot be sold with the USB-compatible logo.

Given that the USB specification makes no provision for a USB device to discover any of the characteristics of a USB port that it is attached to, and furthermore, given that many USB hosts will not correctly determine the amount of power that can be used by a USB device, what is sorely needed are mechanisms by which a USB device can independently determine the capabilities of an upstream USB port and manage its power draw accordingly.

DISCLOSURE OF INVENTION

Accordingly, it is an object of the present invention to provide apparatus and methods for passive USB power configuration switching.

Briefly, one preferred embodiment of the present invention is a method for a universal serial bus (USB) device to perform power configuration to operate with a USB host. A connection to the USB host is enabled. A high-power configuration is reported to the USB host and successful enumeration by the USB host is monitored for. If such enumeration IS NOT forthcoming within a preset time, the connection to the USB host is disabled and re-enabled, and a low-power configuration is reported to the USB host.

Briefly, another preferred embodiment of the present invention is a method for a universal serial bus (USB) device having a VBUS to perform power configuration to operate with a USB host. A connection to the USB host is enabled. A low-power configuration is reported to the USB host and successful enumeration by the USB host is monitored for. If such enumeration IS forthcoming within a preset time, power usage is ramped up until a preset high-power configuration is reached or until there is voltage sag on the VBUS, and then the power usage is ramped down.

And briefly, another preferred embodiment of the present invention is another method for a universal serial bus (USB) device having a VBUS to perform power configuration to operate with a USB host. A connection to the USB host is enabled. A low-power configuration is reported to the USB host and successful enumeration by the USB host is monitored for. If such enumeration IS forthcoming within a preset time, power usage is ramped up while observing for measurable voltage sag on the VBUS until a preset high-power configuration is reached or measurable voltage sag is observed, and then the power usages is set to a calculated maximum current potential of the VBUS.

An advantage of the present invention is that it permits a USB device to independently determine the characteristics of a USB port that it is attached to.

Another advantage of the invention is that it permits a USB device to correctly determine the amount of power that it can use from a USB port that it is attached to.

Another advantage of the invention is that it permits a USB device to configure its power usage according to its own determinations about a USB port that it is attached to.

And another advantage of the invention is that flexibly permits a USB device to make its own determinations about a USB port that it is attached to based on multiple approaches which can be applied individually or in combination.

These and other objects and advantages of the present invention will become clear to those skilled in the art in view of the description of the best presently known mode of carrying out the invention and the industrial applicability of the preferred embodiment as described herein and as illustrated in the figures of the drawings.

BRIEF DESCRIPTION OF THE DRAWINGS

The purposes and advantages of the present invention will be apparent from the following detailed description in conjunction with the appended figures of drawings in which.

In the various figures of the drawings, like references are used to denote like or similar elements or steps.

BEST MODE FOR CARRYING OUT THE INVENTION

Preferred embodiments of the present invention are apparatus and methods for passive USB power configuration switching. As illustrated in the various drawings herein, and particularly in the views of FIGS. 3-5, preferred embodiments of the invention are depicted by the general reference character 100.

The present inventive switching system 100 offers two general approaches to USB power configuration. One of these is termed the "Polite Approach," the other is termed the "Impolite Approach." These two approaches can also be used in sequence (first the Polite Approach, and then the Impolite Approach). Only the Polite Approach is recommended for USB devices that are to be compliant with the USB specification, but the Impolite Approach may nonetheless have some limited utility.

Figure 3:
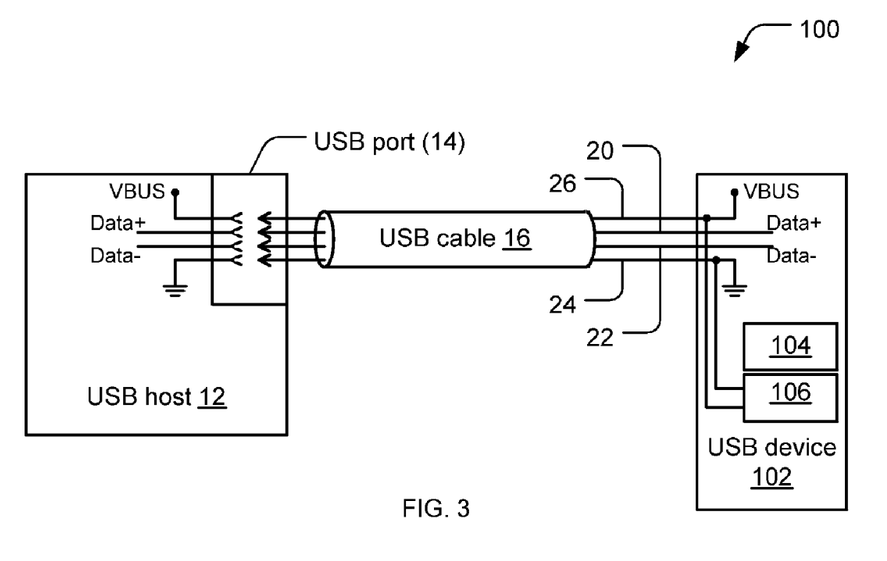
FIG. 3 is a schematic diagram depicting the key features of a USB device that is modified to employ both of two approaches that are in accord with the present invention.

FIG. 3 is a schematic diagram depicting the key features of a USB device 102 that is modified to employ both the Polite Approach and the Impolite Approach. The USB device 102 can resemble the conventional USB device 18 (FIG. 2) with two notable exceptions. The USB device 102 has circuitry 104 to operate its enhanced USB functions, as well as for whatever utilitarian functions it provides. The USB device 102 can also have a voltage sag detection mechanism 106 attached to the VBUS 28. The detection mechanism 106 is optional in instances of the USB device 102 that use the Polite Approach.

Figure 4:
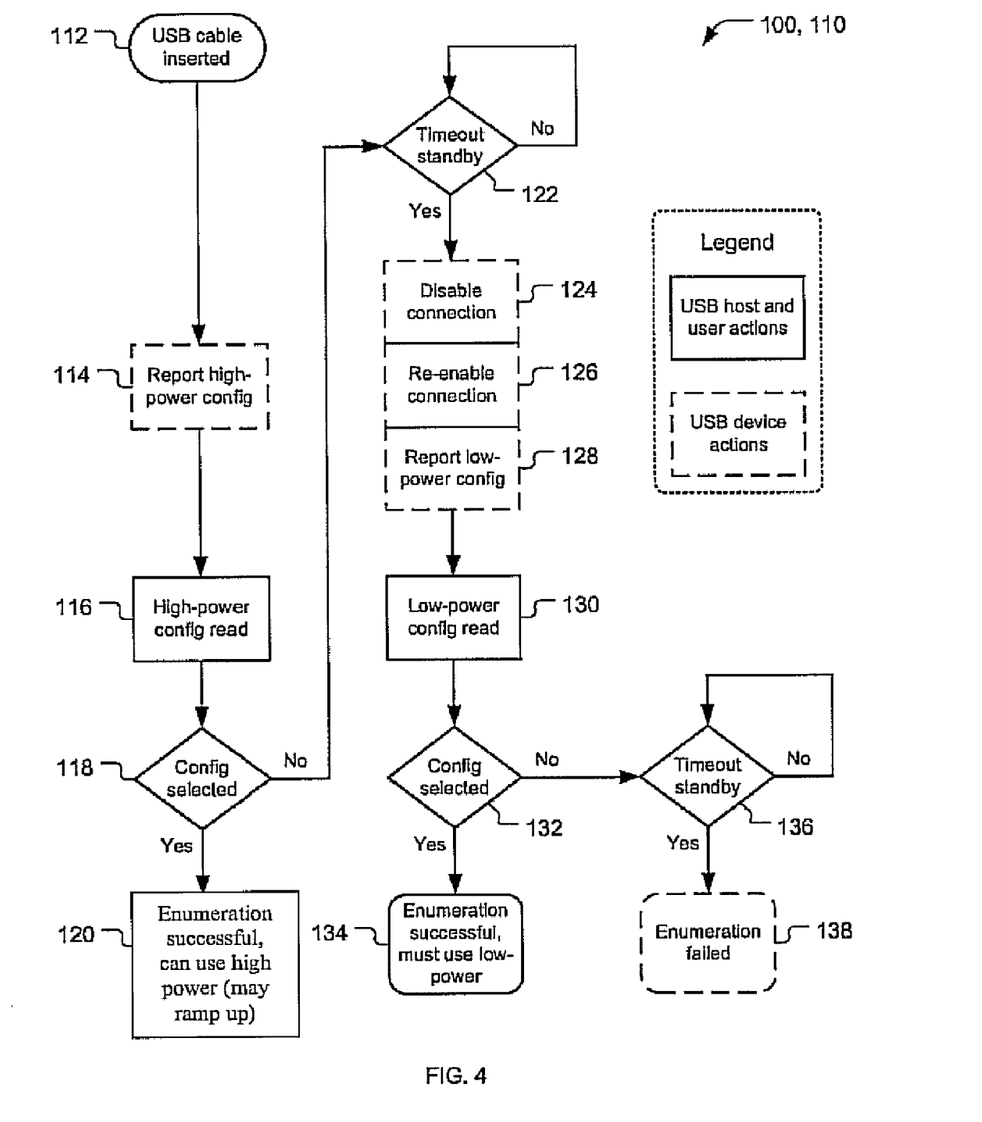
FIG. 4 is a flow chart depicting a polite process that employs the Polite Approach in accord with the inventive switching system.

FIG. 4 is a flow chart depicting a polite process 110 that employs the Polite Approach in accord with the inventive switching system 100. In a step 112 the polite process 110 begins with insertion into a USB port 14 of a USB cable 16 connected to a high-current USB device 102 (or by direct connection of cable-less USB device 102). In a step 114 the USB device 102 reports its actual maximum current requirements in its one and only configuration descriptor to the USB host 12.

In a step 116 the USB host 12 receives the configuration descriptor from the USB device 102, and in a step 118 the USB host 12 determines if the USB port 14 that the USB device 102 is plugged into can support that level of power. If so, in a step 120 the USE host 12 simply configures the USE device 102 for "High Power" and all is well. Alternatively, in 120, power usage may be ramped up until a preset high-power configuration is reached, in an embodiment.

Alternately, if the USB host 12 determines that the USB device 102 is plugged into a USB port 14 that cannot support its maximum power requirements, the USB host 12 does not configure the USB device 102, and in a step 122 it instead temporarily suspends the USB port 14. The USB specification does not necessarily require formal suspension but this is the way, for example, that the Windows™ operating system handles things. Also, a state of "SUSPEND" is "set" simply by a USB host 12 not talking to a USB device 18, 102 for a period of time, so this is a fairly passive operation, although still controlled specifically by the USB host 12.

In a step 124 the USB device 102 now detects a suspended state, or sees no activity on the USB host 12 after a timeout period, and it disconnects from the USB port 14. In a step 126 the USB device 102 changes its configuration descriptor to indicate that it is a low-power device. And in a step 128 it re-enables its connection to the USB port 14.

In a step 130 the USB host 12 now re-enumerates the USB device 102 with the new, low-power configuration descriptor, and in a step 132 the USB host 12 determines if the USB port 14 that the USB device 102 is plugged into can support the newly requested level of power. If so, in a step 134 the USB host 12 responds to the new descriptor by configuring the USB device 102 for "Low Power" and use of the USB device 102 can proceed.

If the USB host 12 responds to the new descriptor by configuring the USB device 102 for operation, this is an indication to the USB device 102 that the USB port 14 that it is plugged into can only support low-power devices. In order to remain "polite" (and to stay within the USB specification), the USB device 102 should not enable any high-power operations, such as battery charging from the VBUS 28. Or, the USB device 102 may now transition to the Impolite Approach (described below) and attempt to draw additional power from the USB port 14.

Alternately, if the USB host 12 determines that it cannot support the USB device 102, perhaps because the USB host 12 does not support the reported class of the USB device 102, the USB host 12 does not configure the USB device 102, and in a step 136 it instead temporarily sets the USB port 14 into a suspended state.

And finally, in a step 138, the USB device 102 either observes that the USB port 14 is in the suspended state or that the USB host 12 has simply not responded within a timeout period, and this indicates to the USB device 102 that its configuration was not successful for a reason other then power requirements. The USB device 102 can now report the configuration failure through its user interface and abandon USB enumeration until the next insertion of the USB cable 16 is detected.

Turning now to the Impolite Approach, it depends on that fact that USB ports 14 are required to support overcurrent protection, as well as the fact that most unpowered USB ports 14 are able to supply high amounts of current although they report support only for low-power device configurations. Use of this approach therefore will likely result in a USB device 102 not passing USB certification, by being able to attempt to draw more power than reported in its configuration descriptor(s).

The Impolite Approach employs the voltage sag detection mechanism 106 (FIG. 3) of the modified USB device 102. This detection mechanism 106 is attached to the VBUS 28, in addition to the conventional VBUS monitoring mechanisms that are already present in a USB device 18, 102. The detection mechanism 106 can include, without limitation to merely these examples, an A/D port or a GPIO input that has been biased with a resistor to report a voltage low condition at a higher voltage than the VBUS detection circuit.

Figure 5:
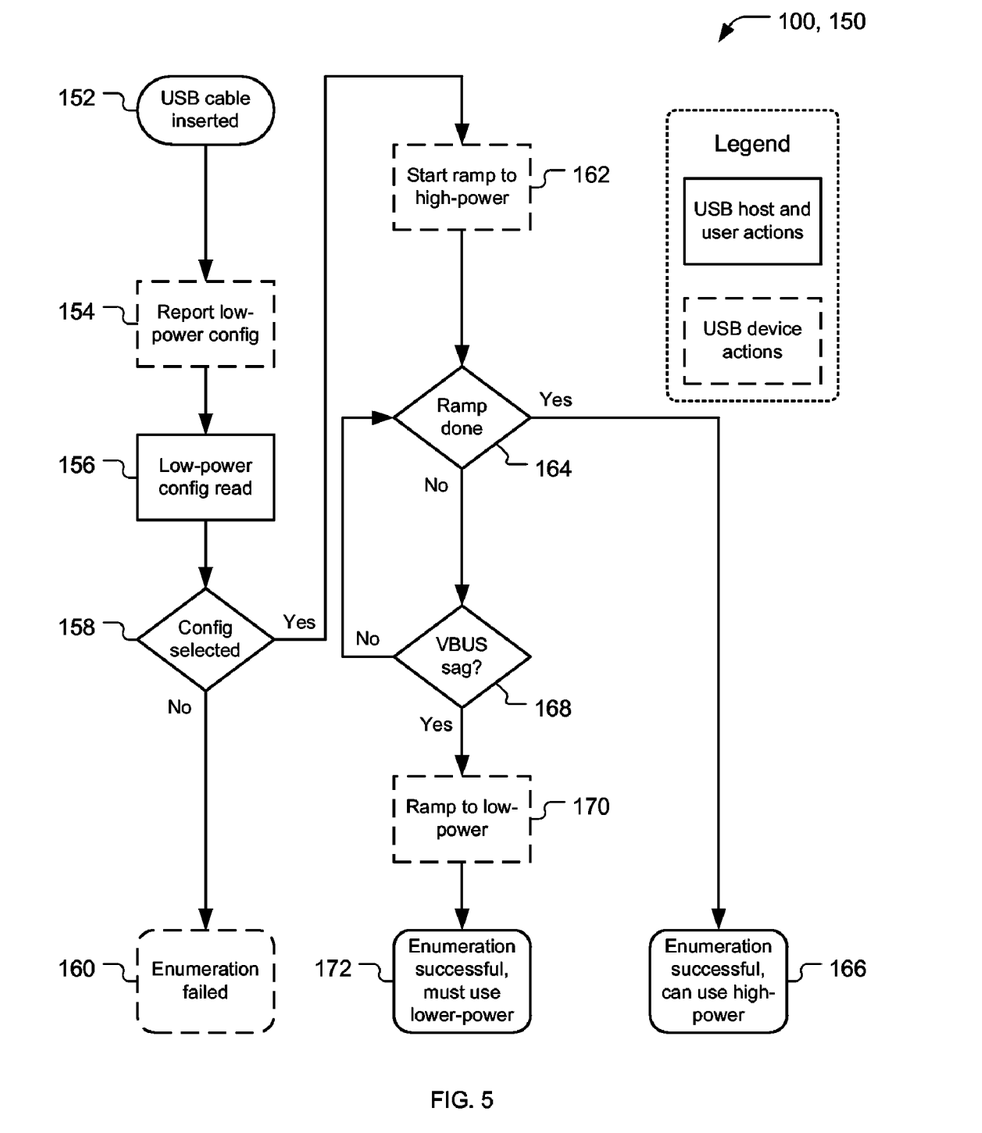
FIG. 5 is a flow chart depicting a first impolite process that employs the Impolite Approach in accord with the inventive switching system.

FIG. 5 is a flow chart depicting an impolite process 150 that employs the Impolite Approach in accord with the inventive switching system 100. In a step 152 the impolite process 150 begins with insertion into a USB port 14 of a USB cable 16 connected to a high-current USB device 102 (or by direct connection of cable-less USB device 102). In a step 154 the USB device 102 reports a need for only a low-power configuration to the USB host 12.

In a step 156 the USB host 12 receives the configuration descriptor from the USB device 102, and in a step 158 the USB host 12 determines, based on the configuration descriptor requesting low-power configuration, if the USB device 102 should be permitted to use the USB port 14 it is plugged into. If not, say, due to some problem other than power, like the USB device 102 being of a non-supported class, in a step 160 the USB device 102 either observes that the USB port 14 is in the suspended state or that the USB host 12 has simply not timely responded. This then indicates to the USB device 102 that its configuration was not successful. The USB device 102 can now report the configuration failure through its user interface and abandon USB enumeration until the next insertion of the USB cable 16 is detected.

Alternately, in a step 162 the USB device 102 observes that it has been configured and it starts ramping up its use of current over and above the 100 mA supported for low-power USB devices. Various conventional mechanisms exist in many USB devices 18, 102 that can be used to ramp up and down the current drawn. For instance, if a device 102 includes a battery charger, this can often be controlled by the circuitry 104 in fine enough increments that the detection mechanism 106 can detect voltage sag on the VBUS 28 below the level called for in the USB specification. Also, many USB devices 18, 102 have multiple ways to control current drain by controlling the utilitarian functions they provide. For instance, a USB device 102 here can ramp-ably change clock speeds, perhaps starting be de-clocking sub-systems that are not in use when the USB device 102 is first connected.

In a step 164 the USB device 102 determines if it has ramped up its use of power to its full needs. If so, in a step 166 the USB device 102 is effectively configured for "High Power" and all is well. If not, in a step 168 the USB device 102 determines with the detection mechanism 106 if there is a voltage sag on the VBUS 28. If not, step 162 is returned to and further ramping up of the power level is undertaken.

Alternately now, if a voltage sag is detected, in a step 170 the USB device 102 immediately removes the additional current draw and in a step 172 it continues operation in a lower-power mode (not necessarily the original low-power mode).

Finally, in the case where a voltage sag is detected and the USB host 12 deconfigures the USB port 14 because of an overcurrent condition, the USB device 102 re-enumerates as a low-power device but does not attempt to ramp current usage after the first attempt.

Figure 6:
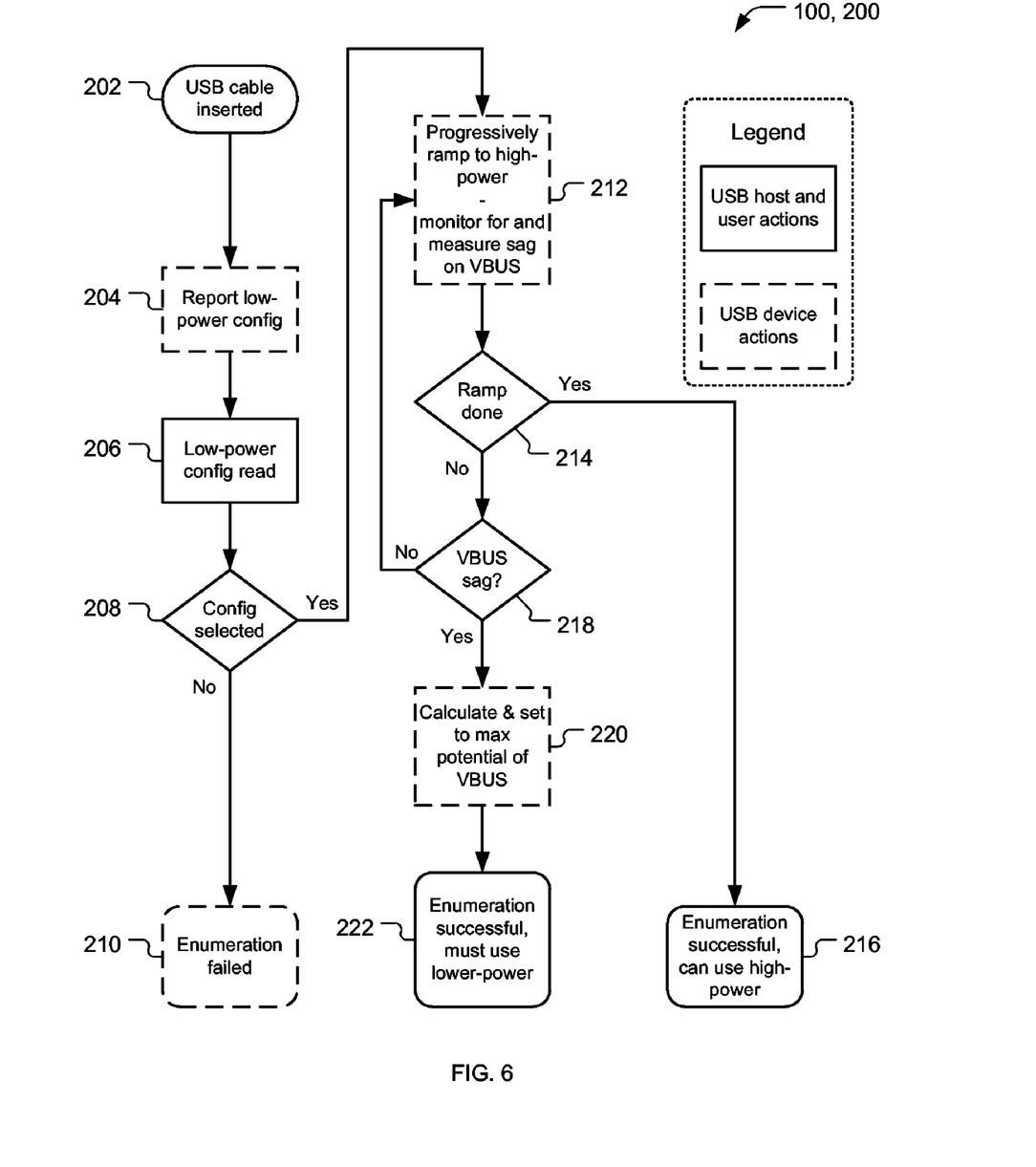
FIG. 6 is a flow chart depicting a second impolite process that employs a variation of the Impolite Approach.

FIG. 6 is a flow chart depicting a second impolite process 200 that employs a variation of the Impolite Approach. In the impolite process 200 the early steps 202-210 can simply be the same as the early steps 152-160 of the impolite process 150 (FIG. 5).

In a step 212, however, things start to proceed differently. The USB device 102 observes that it has been configured and it now selectively ramps up its use of current over and above the 100 mA supported for low-power USB devices. The USB device 102 here further watches for and measures any voltage sag on the VBUS 28.

In a step 214 the USB device 102 determines if it has ramped up its use of power to its full needs. If so, in a step 216 the USB device 102 is effectively configured for "High Power" and all is well. [Both step 214 and step 216 are thus essentially the same as step 164 and step 166 in the impolite process 150.] If not, in a step 218 the USB device 102 determines if there is appreciable voltage sag on the VBUS 28. If not, step 212 is returned to and further ramping up of the power level is undertaken.

Alternately now, if an appreciable voltage sag was measured in step 212, in a step 220 the USB device 102 calculates a maximum current potential for the VBUS 28, sets its actual power usage accordingly, and in a step 222 continues operation in this intermediate-power mode (not necessarily the original low-power mode and presumably below its high-power mode).

Although superficially the same as for the impolite process 150, some steps here in the impolite process 200 can be subtly different. In step 162 most embodiments of the USB device 102 will be designed to ramp power up based on a progression of its functions by desired availability for use. In step 212, however, the goal is to measurably perturb the VBUS 28. For this any suitable incremental series of loads can be used for ramping up, and a much different set of loads then actually applied based on their desirability as a set.

For example, if the USB device 102 is drawing only 50 mA (load "set A") for its most basic needs in the initial low-power stage (step 204), it might add any other available 50 mA load or set of loads ("set B") to be drawing at the 100 mA low-power limit. Then it could apply any available set of loads to load the VBUS 28 at 100 mA. If this does not produce a measurable voltage sag, the USB device 102 can now apply any available set of loads to load the VBUS 28 now at 400 mA. Presume for the sake of this example that this does produce a measurable voltage sag, and that the USB device 102 calculates from this that it can draw a maximum of 425 mA before undue voltage sag will result. If the USB device 102 has a single important function that draws 350 mA, it might now configure itself to run only this and its basic functions (totaling 400 mA). The point to be grasped here is that the USB device 102 can apply intelligent techniques to flexibly provide a more optimal set of functions based on actual conditions encountered.

While various embodiments have been described above, it should be understood that they have been presented by way of example only, and that the breadth and scope of the invention should not be limited by any of the above described exemplary embodiments, but should instead be defined only in accordance with the following claims and their equivalents.

INDUSTRIAL APPLICABILITY

The present inventive switching system 100 is well suited for application in passive USB power configuration switching. USB devices today can be self-powered, bus-powered, or capable of either mode. Increasing, USB devices also have multiple functions, especially in devices using system on a chip (SOC) technologies, and these can often be selectively enabled and disabled. Accordingly, power configuration switching has become increasingly important and improvements in this have heretofore been needed.

The switching system 100 provides three approaches for the passive switching of power configurations in USB devices. These have herein been described as a Polite Approach, a first Impolite Approach, and a second Impolite Approach. These approaches can also be used in combination, and thus provide even greater utility.

The switching system 100 permits a USB device to independently determine the characteristics of a USB port that it is attached to, to correctly determine the amount of power that it can use from that USB port, and to then configure its power usage accordingly. Furthermore, USB devices employing the switching system 100 may, optionally, do this using intelligent situation-based prioritization.

Given all of the benefits that the switching system 100 can provide, however, in a USB device it requires little, if any, additional circuitry and only a small amount to additional logic. When the Polite Approach is used alone, only additional logic is required, and even this can be minimally burdensome in many USB devices because they have unused processing capacity that can be used for this. When either of the Impolite Approaches are used, only simple additional circuitry for a voltage sag detection mechanism is required. Accordingly, the inventive switching system 100 is almost trivially demanding of additional physical resources.

Similarly, the inventive switching system 100 is only slightly demanding on the designers of USB devices. Once the principles disclosed herein are grasped, those of ordinary skill in the art should be able to employ the invention in revising the designs for existing USB devices and by adding it into the designs for new USB devices.

For the above, and other, reasons, it is expected that the switching system 100 of the present invention will have widespread industrial applicability and it is therefore expected that the commercial utility of the present invention will be extensive and long lasting.

What is claimed is:

1. A method for a serial bus (SB) device to perform power configuration to operate with a SB host, the method comprising:
   (a) enabling a connection to the SB host;
   (b) reporting a high-power configuration to the SB host;
   (c) monitoring for successful enumeration by the SB host; and
   (d1) if said successful enumeration is not forthcoming within a preset time, then:
      (1) disabling said connection to the SB host;
      (2) re-enabling said connection to the SB host; and
      (3) reporting a low-power configuration to the SB host;
   (d2) if said successful enumeration is forthcoming within said preset time, ramping up power usage to said high-power configuration.

2. The method of claim 1, wherein said (a) is contemporaneous with physical attachment of the SB device to a SB port of the SB host.

3. The method of claim 1, after said (d2), the method further comprising:
   e) additionally monitoring for said successful enumeration by the SB host; and
   (f) if said successful enumeration is not forthcoming within an additional preset time, reporting enumeration failure on a user interface.

4. The method of claim 1, wherein the SB device has a VBUS, the method further comprising:
   (e) ramping up power usage until the occurrence of one of:
      (1) said power usage reaches a preset high-power configuration; and
      (2) there is voltage sag on the VBUS, and then ramping down said power usage.

5. The method of claim 4, wherein said (d) further includes, after said (e)(2):
   (3) suspension of said connection by the SB host is detected, and then:
      (i) disabling said connection to the SB host;
      (ii) re-enabling said connection to the SB host; and
      (iii) reporting a low-power configuration to the SB host.

6. A method for a serial bus (SB) device having a VBUS to perform power configuration to operate with a SB host, the method comprising:
   (a) enabling a connection to the SB host;
   (b) reporting a low-power configuration to the SB host;
   (c) monitoring for successful enumeration by the SB host; and
   (d) if said successful enumeration is forthcoming within a preset time, ramping up power usage until:
      (1) said power usage reaches a preset high-power configuration; and
      (2) there is voltage sag on the VBUS, and then ramping down said power usage.

7. The method of claim 6, wherein said (a) is contemporaneous with physical attachment of the SB device to a SB port of the SB host.

8. The method of claim 6, wherein said (d) further includes, after said (d)(2):
   (3) suspension of said connection by the SB host is detected, and then:
      (i) disabling said connection to the SB host;
      (ii) re-enabling said connection to the SB host; and
      (iii) reporting a low-power configuration to the SB host.

9. The method of claim 6, after said (d), the method further comprising:

(e) if said successful enumeration is not forthcoming within said preset time, reporting enumeration failure on a user interface.

10. A method for a serial bus (SB) device having a VBUS to perform power configuration to operate with a SB host, the method comprising:
   (a) enabling a connection to the SB host;
   (b) reporting a low-power configuration to the SB host;
   (c) monitoring for successful enumeration by the SB host; and
   (d) if said successful enumeration is forthcoming within a preset time, ramping up power usage while observing for measurable voltage sag on the VBUS, until the occurrence of one of:
      (1) said power usage reaches a preset high-power configuration; and
      (2) said measurable voltage sag is observed, and then setting said power usage based on a calculated maximum current potential of the VBUS.

11. The method of claim 10, after said (d), the method further comprising:
   (e) if said successful enumeration is not forthcoming within said preset time, reporting enumeration failure on a user interface.

12. A system for a serial bus (SB) device to perform power configuration to operate with a SB host, comprising:
   a port interface for connection to the SB host;
   a circuit to operate the SB device, said circuit including:
   a detecting logic to determine if said port interface is connected to the SB host;
   a configuring logic to control power configuration of the SB device, wherein the SB device is capable of at least a low-power configuration and a high-power configuration;
   a communicating logic to report a said power configuration to the SB host;
   a monitoring logic to observe if there is successful enumeration of the SB device by the SB host;
   a connecting logic to selectively disable and re-enable said connection to the SB host; and
   wherein, when said detecting logic determines that said port interface is connected to the SB host, said communicating logic then reports said high-power configuration to the SB host, and
   then, if said monitoring logic observes there is not successful enumeration within a preset time, said connecting logic disables and re-enables said connection and said communicating logic then reports said low-power configuration to the SB host.

13. The system of claim 12, wherein:
   the SB device includes a user interface;
   said circuit further includes an informing logic to advise of enumeration failure on said user interface; and
   wherein, after said communicating logic has reported said low-power configuration to the SB host, and then, if said monitoring logic observes there is not successful enumeration within an additional preset time, said informing logic advises of said enumeration failure on said user interface.

14. A system for a serial bus (SB) device having a VBUS to perform power configuration to operate with a SB host, comprising:
   a port interface for connection to the SB host;
   a circuit to operate the SB device, said circuit including:
   a detection mechanism to detect voltage sag on the VBUS;
   a control mechanism to control power usage of the SB device;
   a detecting logic to determine if said port interface is connected to the SB host;
   a configuring logic to control power configuration of the SB device;
   a communicating logic to report a said power configuration to the SB host;
   a monitoring logic to observe if there is successful enumeration of the SB device by the SB host; and
   wherein, when said detecting logic determines that said port interface is connected to the SB host, said communicating logic then reports a low-power said power configuration to the SB host, and then,
   if said monitoring logic observes there is successful enumeration within a preset time, said control mechanism ramps up said power usage until said power usage reaches a preset high-power said power configuration
   and if said detection mechanism detects said voltage sag, and then said control mechanism ramps down said power usage.

15. The system of claim 14, further comprising:
   a connecting logic to selectively disable and re-enable said connection to the SB host; and wherein:
   said monitoring logic is further to observe if there is suspension of said connection by the SB host; and
   as said control mechanism ramps up said power usage, if said monitoring logic observes said suspension, connecting logic to disable said connection to the SB host, re-enable said connection to the SB host, and communicating logic to then report a said low-power configuration to the SB host.

16. The system of claim 14, wherein:
   the SB device includes a user interface;
   said circuit further includes an informing logic to advise of enumeration failure on said user interface; and
   wherein, after said communicating logic has reported said low-power configuration to the SB host, and then, if said monitoring logic observes there is not successful enumeration within an additional preset time, said informing logic advises of said enumeration failure on said user interface.

17. A system for a serial bus (SB) device having a VBUS to perform power configuration to operate with a SB host, comprising:
   a port interface for connection to the SB host;
   a circuit to operate the SB device, said circuit including:
   a detection mechanism to detect and measure voltage sag on the VBUS;
   a control mechanism to control power usage of the SB device;
   a detecting logic to determine if said port interface is connected to the SB host;
   a configuring logic to control power configuration of the SB device;
   a communicating logic to report a said power configuration to the SB host;
   a monitoring logic to observe if there is successful enumeration of the SB device by the SB host; and
   wherein, when said detecting logic determines that said port interface is connected to the SB host, said communicating logic then reports a low-power said power configuration to the SB host, and then, if said monitoring logic observes there is successful enumeration within a preset time, said control mechanism ramps up said power usage until said power usage reaches a preset high-power level and if a measurable voltage sag is observed by said detection mechanism, and then said control mechanism sets said power configuration based on a calculated maximum current potential of the VBUS.

18. The system of claim 17, wherein:

the SB device includes a user interface;

said circuit further includes an informing logic to advise of enumeration failure on said user interface; and wherein, after said communicating logic has reported said low-power configuration to the SB host, and then, if said monitoring logic observes there is not successful enumeration within an additional preset time, said informing logic advises of said enumeration failure on said user interface.

* * * * *